United States Patent [19]

Park

[11] Patent Number: 5,397,865
[45] Date of Patent: Mar. 14, 1995

[54] DIGITIZING TABLET WITH DISPLAY AND PLOT CAPABILITY, AND METHODS OF TRAINING A USER

[76] Inventor: Noel S. Park, 1004 Oaktree Dr., San Jose, Calif. 95129

[21] Appl. No.: 151,515
[22] Filed: Nov. 15, 1993
[51] Int. Cl.⁶ .......................................... G08C 21/00
[52] U.S. Cl. ...................................................... 178/18
[58] Field of Search .................. 178/18, 19; 33/1 M, 33/1 N; 340/178

[56] References Cited

U.S. PATENT DOCUMENTS

| | | | |
|---|---|---|---|
| 3,346,724 | 10/1967 | Fuhrmeister et al. | 235/61.6 |
| 3,402,549 | 8/1969 | Hamilton-Fey | 178/18 |
| 3,453,388 | 7/1969 | Neville | 178/18 |
| 4,419,672 | 12/1983 | Hird | 346/33 M |
| 4,464,118 | 8/1984 | Scott et al. | 434/85 |
| 4,506,336 | 3/1985 | Hird | 364/518 |
| 4,633,416 | 12/1986 | Walker | 364/521 |
| 4,813,146 | 3/1989 | Jaluzot | 33/1 M |
| 4,973,800 | 11/1990 | Sindeband et al. | 178/18 |
| 5,004,870 | 4/1991 | Osborn | 178/18 |
| 5,097,415 | 3/1992 | Yoshimura et al. | 364/237.1 |
| 5,100,329 | 3/1992 | Deesen et al. | 434/327 |
| 5,194,852 | 3/1993 | More et al. | 340/712 |

*Primary Examiner*—Stephen Chin
*Assistant Examiner*—Kevin Kim

[57] ABSTRACT

An interactive training aid system is described which includes a digitizing tablet having a stylus for making inputs to a computer and a display panel for displaying outputs from the computer. Various modes of operation are described wherein the computer prompts the user to draw or trace a figure (e.g., line, curve, pattern, etc.), and the user's efforts are analyzed by the computer. For example, the computer can cause the display to draw ahead of the user. Additionally, the computer can force the user to adhere to the prescribed task ("toe the line", in a manner of speaking) by applying resistive and/or motive force to the stylus.

9 Claims, 3 Drawing Sheets

DIGITIZING TABLET WITH DISPLAY AND PLOT CAPABILITY, AND METHODS OF TRAINING A USER

TECHNICAL FIELD OF THE INVENTION

The invention relates to devices for tracing and/or displaying patterns and, more particularly to digitizing movements of a stylus and inputting same to a computer, and also to digitally representing patterns stored in a computer on a display device.

BACKGROUND OF THE INVENTION

Digitizing devices are well known, and generally have a stylus or reticle (with cross-hair) that the user positions at discrete points or moves along a line or curve. The device provides output signals indicative of the position of the stylus or reticle, such as to a computer. Generally, the user is tracing an already-existing pattern to digitize the pattern for further manipulation in a computer.

U.S. Pat. No. 3,346,724, incorporated by reference herein, discloses an example of a random function tracer, for tracing lines on a map and for converting these tracings into Cartesian coordinates. The device utilizes certain features of a standard drafting machine in that there is a first arm section having one end that is pivotally connected to the table, a second arm section having one end pivotally connected to the other end of the first arm section. A stylus is provided at the other end of the second arm section. Potentiometers are provided at the two pivot points, at the one ends of the first and second arm sections. As the stylus is moved, the output of each potentiometer is proportional to the angle that one of the two arm sections has been rotated with respect to the other section and to the table.

Other examples of digitizing devices ar found in U.S. Pat. Nos. 4,419,672; 4,813,146; 4,973,800; 5,004,870; and 5,097,415, incorporated by reference herein.

Plotting devices are also known, and generally involve some kind or articulated arm or carriage arrangement which moves a pen or the like in a pattern, for example under the control of a computer.

U.S. Pat. No. 3,453,388, incorporated by reference herein, discloses a telescribing apparatus having separate transmitter (digitizing) and receiver (plotting) units. The receiver unit has servomotors for positioning a stylus, and also has an electromagnetic clutch operable to couple and decouple the receiver stylus shafts from the servomotor shafts. The clutch is disengaged to permit accommodation of drift in the transmitter and receiver units, and after a predetermined time delay is energized to couple said servomotor shafts to the styli shafts to permit unison movement of the transmitter and receiver styli.

Various elements of digitizers and plotters have been used as learning aids, for example to improve penmanship and drawing skills.

U.S. Pat. No. 4,464,118, incorporated by reference herein, discloses a device combining an optical image processing system with a speech synthesis system, wherein a drawing surface is provided in registration with the field of view of an optical imager. The user is requested, either visually via a display mounted on the housing of the device in proximity to the drawing surface, or verbally via speech synthesis electronics, to write or draw something on the drawing surface. When the user has completed the assignment by drawing indicia on the drawing surface, the image processing system, which includes an imager chip, a matrix memory in which signal data output from the imager chip is stored, and a data processor having an object recognition comparator, is actuated. The imager views the indicia as drawn by the user on the drawing surface and provides a signal data output indicative of the appearance of the indicia. The drawn indicia is then compared via the recognition comparator with the particular object configuration stored in memory and corresponding to the drawing instruction given to the user. Based upon the comparison, the speech synthesis system then gives an audible verbal response critiquing the writing or drawing of the user on the drawing surface and may be accompanied by a visual showing of the correct drawing on the display. As shown, for example, in FIG. 4 of this patent, the display (23) is separate and discrete from the drawing surface (10). Whereas indicia drawn by the user on the drawing surface are sensed in the imager (11), responses generated by the microprocessor are displayed on the separate display (23).

The system described in the above-referenced U.S. Pat. No. 4,464,118 is a didactic device for providing a learning experience and/or entertainment by serving as a learning aid to improve penmanship and drawing skills. The device contemplates a display mounted in proximity to the drawing surface. This requires the user to look at a pattern in one place, and draw (attempt to replicate) the pattern in another place on the overall device. This type of operation can be considered to by "copying", as opposed to "tracing". In contrast to such "copying", for "tracing", the user would create a pattern directly over an already-existing image.

U.S. Pat. No. 5,100,329 discloses a computer-assisted coaching method for helping students (users) in acquiring and developing the ability to perform an art or a skill. This is done by an interactive sequence wherein responses made by the student to inquiries and directives are digitized and compared with hidden idealized parameters and with previous responses.

U.S. Pat. No. 4,506,336 discloses a point location and graphics display apparatus which uses a rolled, flexible steel tape having a stylus at its outer extremity. An angle encoder and a linear encoder, respectively, are driven by rotation of the tape (via roller sprockets engaging the tape), and provide signals to a computer which digitizes and supplies those signals to a display.

U.S. Pat. No. 4,633,416 discloses a video image creation system which simulates a drafting tool. Images are created under manual control, which effectively defines the coordinates of the artist's (user's) implement at any given time. A processor receives the incoming image data, and previously derived data from a frame store, and modifies this data in dependence on a parameter available from another store. The parameter controls the contribution made from any adjacent, previously-created parts of the image, and can be such as to simulate different pencil or brush shapes or types of paint, for example. Additional facilities such as pressure sensitivity and blurring can be provided.

DISCLOSURE OF THE INVENTION

It is therefore an object of the present invention to provide improved apparatus and techniques for teaching drawing and/or writing skills, in a system that can readily be adapted to various user skill levels, and that provides the user with effective cues as to correct responses in an efficient, ergonomic manner.

According to the invention, generally, a device is capable of digitizing user inputs (e.g., movement of a stylus on a surface), and is also capable of displaying stored patterns or indicia on a display panel. Preferably, the surface upon which the stylus is moved is also the display panel.

Movements of the stylus are encoded, and provide signals to a computer indicative of the position and movement of the stylus.

A storage device is associated with the computer for accessing, and ultimately displaying on the display panel, predefined patterns and indicia which are intended for the user to replicate. The patterns and indicia are preferably stored as files in a library. Each file may also contain additional information such as speech synthesis parameters and levels of complexity associated with the particular pattern or indicia. For example, an image (pattern or indicia) may be stored in a file as a plan view of an object, a wire-frame view of the object, or a perspective view of an object.

In a first mode of operation, the computer accesses a file and displays points (dots) representing an image of an object. The user is then prompted (e.g., by virtue of having selected the first mode, by one or more lines of instructions on the display, or by synthesized speech) to "connect the dots" (draw a line from dot-to-dot) to complete the image. Signals from the stylus may be evaluated by the computer to determine whether the dots have been connected in a proper sequence. The movement "history" of the stylus on the surface can be represented on the display panel immediately under and in register with the stylus. In other words, when a line is being drawn by the user, that line is being progressively displayed immediately underneath the stylus.

In one embodiment, a particular dot is predetermined to be the starting point, and may be represented on the display in a manner dissimilar from the remaining dots (e.g., the starting dot can be larger, or a different color from the remaining dots). In another embodiment, the user can start with any dot, so long as the stylus moves from dot-to-dot in an appropriate manner. In another embodiment, faint lines are displayed between the dots, and indicate how the dots are intended to be connected to one another. Upon successful completion of the connect the dots task, the computer provides positive feedback to the user, such as by sounding a tone or series of tones, or by providing a synthesized message (e.g., "well done"), by displaying an image indicative of successful completion of the task, or the like. In the event that the task of connecting the dots is not successfully completed, the computer provides constructive criticism feedback in a suitable manner such as by showing the correct line(s) connecting the dots and/or by providing audible instructions to the user.

In a second mode of operation, the computer accesses an image file and simply instructs the user to draw the image (by moving the stylus in an appropriate manner). For example, the computer audibly annunciates "draw a triangle". When the user has moved the stylus in three appropriate line segments, the computer indicates that the task is successfully completed.

In the second mode of operation, as in the first mode of operation, the user's movement of the stylus can be represented on the display, and feedback for correct and incorrect responses can be provided. For example, the computer prompts the user to draw a circle. The user draws an ellipse. The computer responds by annunciating that the circle drawn by the user is not perfectly round, and causes a perfect circle to be displayed. Moreover, the "correct" circle can be simultaneously or alternately displayed with the user-drawn imperfect circle.

In one embodiment of the second mode of operation, the user is prompted to draw an image on the surface, without any constraint as to where or how large the image is drawn.

In another embodiment of the second mode of operation, the user is prompted to draw an image on the surface, within certain predetermined metes and bounds, such as "draw a circle in the box". In this case, the box would be displayed by the computer on the display panel.

In a third mode of operation, the computer displays an evolving image. For example, the computer prompts the user to follow along (with the stylus) as an image is progressively displayed. In order that the user does not get ahead of the image being generated on the display, the position and speed of the stylus are sensed by the computer, which can then adjust the "lead" of the evolving image. For example, the computer can ensure that the evolving image is "n" pixels ahead of the stylus, where n is a suitable number greater than one. In this mode, constructive feedback is also provided to the user. For example, a threshold can be established so that if the user strays too much (i.e., in excess of the threshold) from the line of the evolving image, the evolving image pauses and the user is directed (e.g., by speech synthesis) to re-do the latest portion of the image. Additionally, the threshold can be adaptive in the sense that for each session it is assumed that there is a particular user. A history of the particular user's skill level (accuracy in following the evolving line) can be developed in short order, such as on the first image the user attempts to draw, and the threshold can be adaptively set to be just within or just without the user's perceived skill level.

As mentioned hereinabove, a meritorious feature of the present invention is that the digitizing surface (the surface upon which the user moves the stylus to draw an image) is the same as the display panel. This enables the user to trace images or partial images, as opposed to looking in one place and drawing in another place.

It should be understood that the images may be any pattern or indicia suitable for representation on a two dimensional display panel. This includes shapes, letters, and the like.

As mentioned above, when the user is actually tracing an image (moving the stylus along lines displayed by the computer), the student may deviate from the displayed line.

According to an aspect of the invention, the digitizing portion of the apparatus includes an arm with a stylus at one end. The other end of the arm is fixed to a housing of the apparatus. The arm is jointed to permit the user to move the stylus relatively freely to any position on the drawing surface. As described in greater detail hereinbelow, the arm is preferably also capable of constraining the free movement of the stylus. For example, the joints of the arm can be provided with electromagnetic clutches or "bucking" motors responsive to signals from the computer. If, for example, the user is attempting to follow an evolving line displayed by the computer, the user can be prevented from straying too far (above a predetermined threshold) from the line by the computer applying (via the electromagnetic joint clutches or motors) increased resistance to the free movement of the arm—thereby constraining movement of the stylus to mimic the image.

Other objects, features and advantages of the invention will become apparent in light of the following description thereof.

DETAILED DESCRIPTION OF THE INVENTION

INPUT DEVICE

This aspect of the invention is related to a coordinate input device. As a device for inputting a handwritten character, figure or the like to a processor such as a computer, a coordinate input device using various kinds of input pens, a tablet, and the like, is known. According to this kind of apparatus, image information consisting of the input character, figure or the like is output to a display device such as a CRT or LCD display and a reading/storage device such as a printer/memory.

Various methods of detecting coordinates are:
(1) detecting a change of resistance;
(2) detecting a change in electromagnetic or electrostatic induction; and
(3) detecting a change in propagation time of ultrasonic vibration.

According to the invention, a coordinate input device detects coordinates of an instructed position from an angular displacement of a manually moveable, articulated arm. The coordinate input device of the present invention comprises a planar writing pad, a pen holder with a contact sensor for sensing the contact between the pen and a paper on the writing pad, an articulated arm capable of extending over the writing surface and capable of pivoting in the plane of the writing surface. Two angular displacement sensors measure the extension and the pivot angle of the arm. A microcomputer controller converts the angular information into "X" and "Y" stylus tip coordinates. A display screen under the control of the microcomputer controller is provided at the writing surface under the stylus. The microcomputer controller can relate the stylus coordinates to the coordinates on the display screen, thereby permitting the trace of the stylus over the writing surface to be accurately reproduced on the computer display.

The contact sensor can be a pressure sensor for measuring an amount of pressure exerted upon the stylus tip, a switch for detecting pressure against the writing surface, or an audio sensor. Alternatively, a manual pushbutton switch can be activated by the user to indicate, for example, in a depressed state of the switch that the apparatus is in a "writing" or "pen-down" mode and in an un-depressed state of the switch that the apparatus is in a "non-writing" or "pen-up" mode. Such a manual pushbutton (analogous to the push buttons on a mouse) could be located on the stylus holder, on the stylus itself, or elsewhere on the apparatus.

Figure 1A:
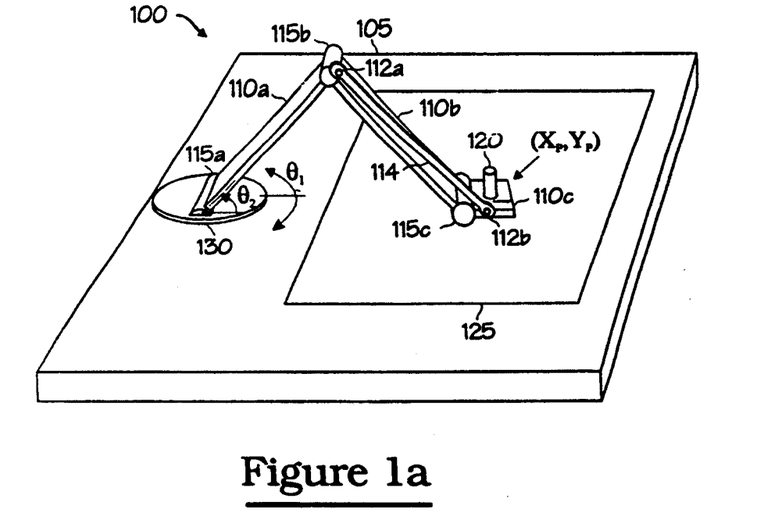
FIG. 1a is a perspective view of a digitizing tablet, according to the invention.

FIG. 1a is a diagram of a coordinate input device 100 (coordinate digitizer) according to the invention. The input device 100 comprises an articulated writing arm attached to a planar writing pad. The writing pad has a designated writing area 125 defined thereupon. The articulated writing arm includes a first writing arm segments 110a and a second writing arm segment 110b, joined by a hinge joint 115b between them. The two writing arm segments are equal in length. The end of the first writing arm segment opposite its connection with the second writing arm segment 110b is joined by a hinge joint 115a to a pivot disc 130, which is mounted to the writing pad 105 in a manner which permits it to pivot freely in the plane of the writing pad 105. A first angular displacement sensor (described below with respect to FIG. 1d) detects the angular displacement ($\Theta_1$) of the pivot disc 130. A second angular displacement sensor (described below with respect to FIG. 1c) detects the angular position ($\Theta_2$) of the first writing arm segment 110a with respect to the surface of the writing pad 105. The second writing arm segment 110b is joined at the end opposite its connection to the first writing arm segment 110a by a third hinge joint 115c to a stylus holder 110c. The stylus holder contains a stylus 120, and includes a pressure switch or sensor to detect contact between the stylus 120 and the writing area 125. Preferably, the stylus is a removable "cartridge" which can be interchanged with several different types of stylus, e.g., a non-marking (tracing) stylus, a ball-point pen stylus, etc..

A first pivot pin 112a connected to the first writing arm segment 110a and a second pivot pin 112b on the stylus holder 110c are joined by a link arm 114 which serves to maintain the orientation of the stylus 120 and stylus holder 110 relative to the plane of the writing area 125, and to control the angle between the first writing arm segment 110a and second writing arm segment 110b. Specifically, the link arm 114 (which is pivots freely about the pivot pins 112a and 112b) creates a parallelogram structure which keeps the stylus perpendicular to the surface writing area 125.

The stylus position ($X_p$, $Y_p$) is determined as a function of the two measured angular displacements ($\Theta_1$) and ($\Theta_2$). The coordinate input device 100 is essential a polar coordinate (angle and radius) transducer. The rotation angle is determined directly from the first angular displacement sensor. The radius (distance from the center of the pivot disc 130 to the stylus tip) is determined from the angle between the first writing arm segment 110a and the surface of the writing pad 105, as determined by the second angular displacement sensor.

Given the second angular displacement ($\Theta_2$), the radius "R" is determined according to:

$$R = 2\ \mathrm{l}\ cos(\Theta_2) + dr$$

where:

"l" is the writing arm segment length, and

"dr" is the distance from the stylus tip to the end of the second writing arm segment 110b.

This equation assumes that the angle formed between the second writing arm 110b and the writing pad 105 is equal to the angle formed between the first writing arm 110a and the writing pad 105. The link arm 114 enforces this.

The "X" and "Y" coordinates ($X_p$, $Y_p$) of the stylus tip may now be readily determined in a simple polar to rectangular coordinate system conversion, as follows:

$$X_p = R\ cos(\Theta_1) - X_o$$

and $$X_p = R\ sin(\Theta_1) - Y_o$$

where:

"$X_o$" and "$Y_o$" are the reference coordinates of an origin point on the writing surface.

One of ordinary skill in the are will appreciate that in applications where, for example, a cross-hair reticle in a flat, transparent piece (a "stylus-less" stylus holder) is traced over the surface, the mere act of holding the reticle against the writing area will inherently keep it flat and maintain its orientation. As a result, the link arm 114 is not needed. Alternatively, the hinge joint 115c and stylus holder 110c can be adapted so that the tip of the stylus 120 is positioned immediately at the end of the second writing arm 110b, eliminating the need for the link arm 114.

In the event that a transparent piece with a reticle is used, the center of the reticle (e.g., the intersection of perpendicular cross-hairs) is, in effect, the "stylus"; the transparent piece is effectively the "stylus holder"; and the function of the contact sensor can be provided by a push-button.

Figures 1B, 1C, 1D:
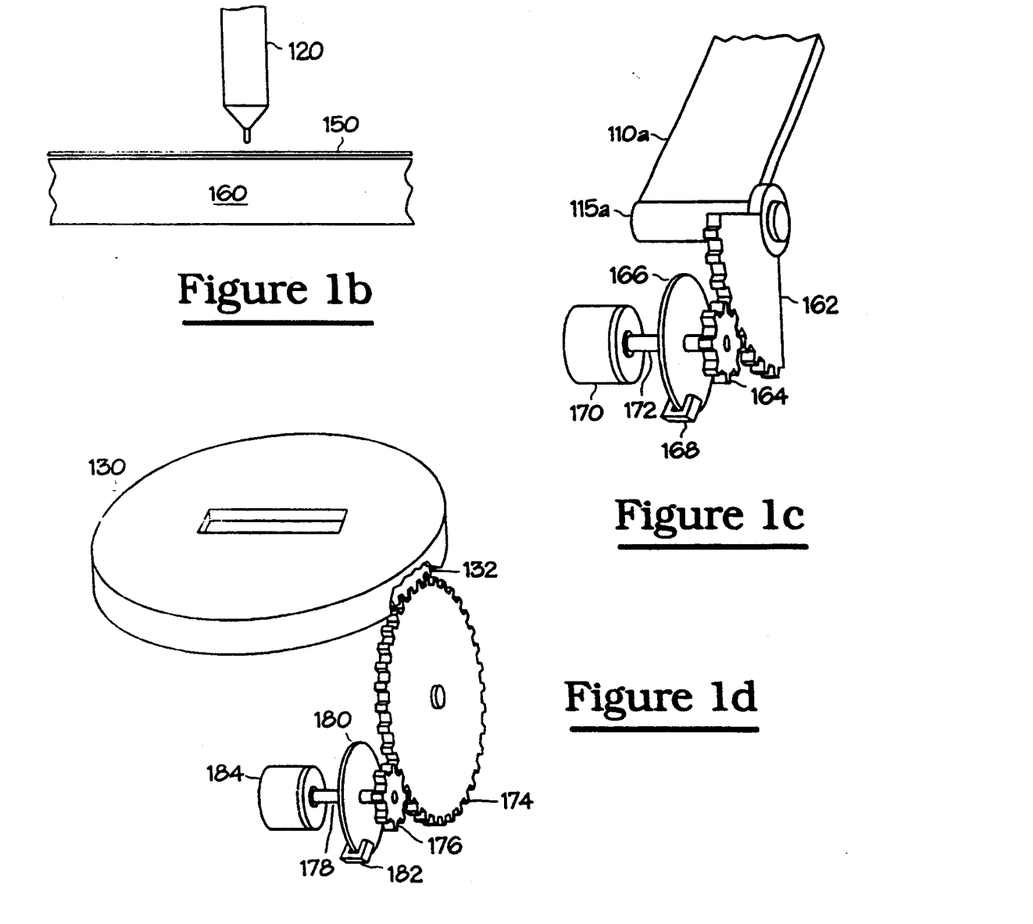
FIG. 1b is a cross-sectional view of a portion of the digitizing tablet of FIG. 1a, according to the invention.
FIG. 1c is a view of a mechanism for measuring the angular displacement of an arm and for applying mechanical resistance thereto, according to the invention.
FIG. 1d is a view of a mechanism for measuring the rotational displacement of a pivot disc and for applying mechanical resistance thereto, according to the invention.

FIG. 1b is a cross-sectional view of a portion of the writing area 125. Preferably, the writing area includes a graphic display screen 160 for display of computer generated textual and graphic information concurrently with determination of stylus coordinates over the surface of the writing area 125. A sheet of paper, tracing paper, or transparent film 150 can be placed between the stylus and the display screen 160.

Alternatively, a clear window can be provided in place of the display screen, permitting the coordinate input device 100 to be placed over the face of a computer monitor, allowing the monitor screen to show through the window.

FIG. 1c is a view of mechanical apparatus for determining the angular position ($\Theta_2$) of the first writing arm segment 110a and for applying a force or mechanical resistance thereto. The first writing arm 110a is rigidly attached via the hinge joint 115a to a sector gear 162. (Provisions can also be made for removal and replacement of the writing arm by means of a snap-in locking mechanism or other removable coupling which is rigidly attached in its locked or engaged state.) The sector gear 162, in turn, drives a gear 164 which is mounted to a shaft 172 in common with a force device 170 and a shaft encoder disc 166. A shaft encoder pickoff 168 reads marks or other encoding on the shaft encoder disc 166 to determine the angular displacement of the first writing arm segment. The force device 170 can be a friction clutch or a motor. If a motor is used, the motor is driven to apply a "bucking" force to resist motion of the first writing arm segment 110a. If a clutch is used, then the clutch is controlled to apply a mechanical resistance to motion of the first writing arm segment 110a.

One of ordinary skill in the art will readily appreciate that many different techniques for determining angular displacement and for applying mechanical resistance to the motion of the writing arm segment are available and can be readily substituted for the techniques described herein. The apparatus described with respect to FIG. c is merely exemplary of such techniques, and it is within the spirit and scope of the present invention to substitute any suitable alternative technique.

FIG. d is a view of mechanical apparatus for determining the first angular displacement ($\Theta_1$). The pivot disc 130 includes a downward facing ring gear 132. The ring gear 132 drives an idler gear 174, which in turn drives a gear 176 mounted to a shaft 178 in common with a force device 184 and a shaft encoder disc 180. A shaft encoder pickoff 182 reads marks or other encoding on the shaft encoder disc 180 to determine the angular displacement of the pivot disc 130. As before, the force device 184 can be a friction clutch or a motor. If a motor is used, the motor is driven to apply a "bucking" force to the pivotal motion of the pivot disc 130. If a clutch is used, then the clutch is controlled to apply a mechanical resistance to the pivotal motion of the pivot disc 130.

As with the apparatus of FIG. 1c, one of ordinary skill in the art will readily appreciate that many different techniques for determining angular displacement and for applying mechanical resistance to the motion of the pivot disc are available and can be readily substituted for the techniques described herein with respect to FIG. 1d. The apparatus described herein is merely exemplary of such techniques, and it is within the spirit and scope of the present invention to substitute any suitable alternative technique.

In order to facilitate the attachment of writing arms of different designs (e.g., with special capabilities, different dimensions, etc.) it is advantageous to provide means for removing and replacing writing arms. One of ordinary skill in the art will immediately recognize that this can be accomplished by providing the first writing arm (e.g., 110a) with a suitable snap-in locking mechanism or other suitable removal/replacement mechanism.

Figure 2:
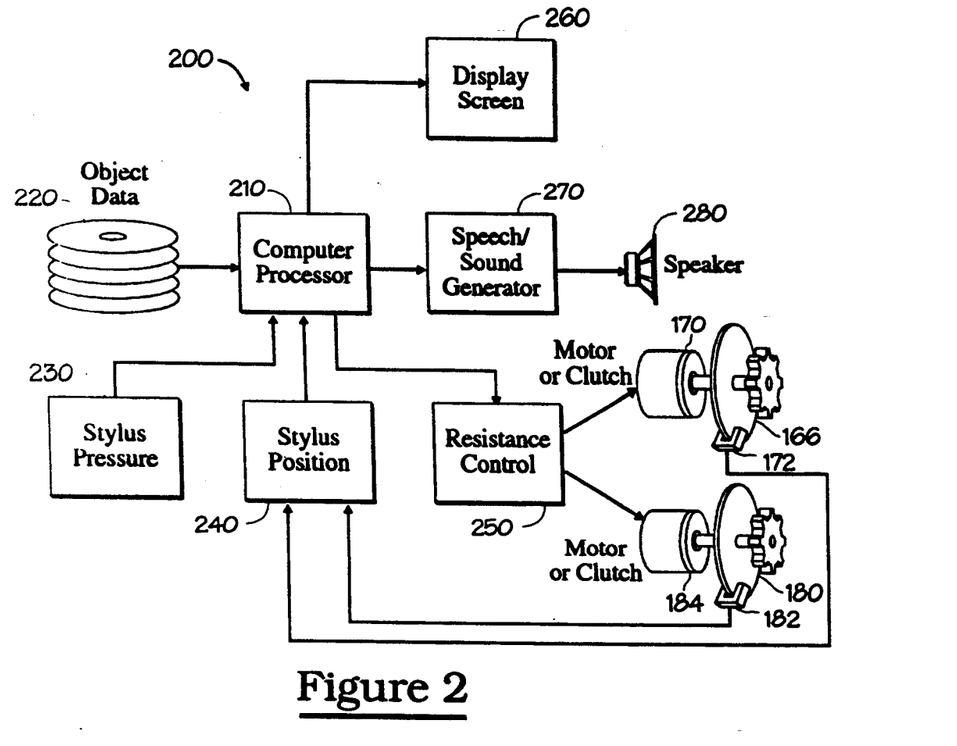
FIG. 2 is a block diagram of a interactive training aid system, according to the invention.

FIG. 2 is a block diagram of a computer-based interactive training system 200 according to the present invention. The training system makes use of and operates in concert with the coordinate input device described hereinabove with respect to FIGS. a–d. Information about various types of objects is stored on a storage device 220 which interfaces to a computer processor 210. The object data includes information about various geometric shapes (square, circle, triangle, etc.), letters of the alphabet, numbers, miscellaneous symbols, and about acceptable drawing "tolerances" in forming these shapes and symbols to be used in interactive training of a user (typically a child learning to write and/or draw). The computer processor 210 controls a display screen 260 (preferably mounted in the writing area of the coordinate input device, and a speech/sound generator 270 which in turn drives a speaker 280. The speech/sound generator 270 and speaker 280 are used to generate spoken messages and or audible tones under the control of the computer processor 210. Through a resistance control circuit 250, the computer processor 210 separately controls the amount of resistance to be applied to the motion of the writing arm and pivot disc via the two force devices 170 and 184 (see FIGS. 1c, 1d). A stylus position interface 240 provides the computer processor with angular displacement data from the writing arm shaft encoder disc 166 and pickoff 172, and from the pivot disc shaft encoder disc 180 and pickoff 182. A stylus pressure interface 230 provides the computer processor 210 with information about pressure on the stylus (see 120 FIG. 1). The stylus pressure interface 230 converts data from a stylus pressure sensor, pressure switch, or other suitable transducer (as discussed hereinabove) into a form readable by the computer processor 210.

It should be noted that position information from the stylus position interface 240 is provided independent of stylus pressure information from the stylus pressure interface 230. This means that the stylus position can be monitored in between "writing" strokes (i.e., pen-down strokes) of the stylus. This is particularly useful in such applications as oriental character recognition, where "properly" formed characters are drawn as a series of strokes in a pre-determined order, with pre-determined motions. The motions of the stylus between "pen-down" strokes can be used to great advantage in ensuring correct character recognition. This "pen-up" monitoring is also useful in teaching proper formation of block-printed characters in the Roman or Cyrillic alphabet, since some patterns of strokes (especially those that finish towards the right hand side of the character) are more efficient in "setting-up" the next character to be drawn.

The system 200 operates interactively with a user to aid the user in learning certain drawing and writing skills. For example, the computer 210 will display a character to be traced over on the display screen 260. The user moves the stylus 120 over the displayed character, as instructed by the computer 210. The computer follows the motion of the stylus 120 by means of the stylus position interface 240. The stylus position is compared with the known location of the character and tolerance limits for that character stored on the storage device 220 and determines whether the character is being correctly traced over. If it is, the computer provides positive reinforcement via the sound generator (e.g., "very good", or a success tone) and/or display (e.g., happy-face symbol). If not, the computer provides constructive criticism, such as indicating the point on the display where the stylus 120 went outside of the pre-established tolerance limits for the character and/or generating an error tone or message (e.g., "Why don't you try that again") and/or displaying an error symbol (e.g., "oops" face) on the display screen.

MODES OF OPERATION

Figure 3:
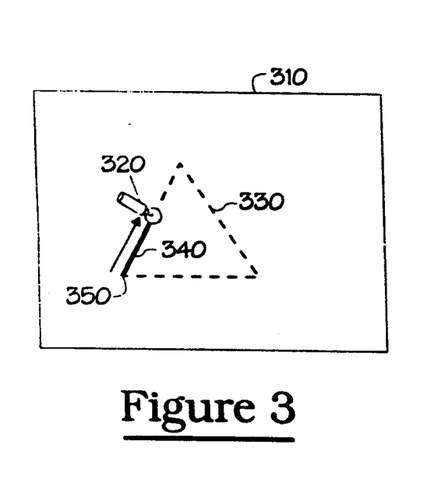
FIG. 3 is a plan view of the interactive training aid system of the present invention in an exemplary mode of operation.

FIG. 3 illustrates one interactive mode of operation of the system. An outline of a shape or symbol 330 (in this case, a triangle) is displayed on the display screen 260 (see FIG. 2). The user traces the shape 330 from a starting point 350 in the direction indicated (arrow), and the computer acknowledges the user's actions by highlighting the shape along the path 340 the user has traced. The movement "history" of the stylus on the surface is represented on the display screen 260 immediately under and in register with the stylus 320 (comparable to stylus 120, FIG. 1). The outline can be displayed in a first color and the highlighting in a second color. Alternatively, line thickness can be used to highlight the user action. For example, the shape 330 can initially be displayed in thin lines which are thickened as the user traces them, or vice versa. Both line thickness and color can be used in combination.

Another variation on this theme is an "erasing" scheme where the highlighting process simply converts the highlighted areas to the background color on the screen, effectively making the shape disappear as the user traces it. Once the whole shape 330 disappears, the user is successful.

In still another variation on this theme, the computer displays the shape 330 as an evolving image. For example, the computer prompts the user to follow along (with the stylus 320) as the shape 330 is progressively displayed. In order that the user does not get ahead of the image being generated on the display, the position and speed of the stylus 320 are sensed by the computer, which can then adjust the "lead" of the evolving image. For example, the computer can ensure that the evolving image is "n" pixels ahead of the stylus 320, where "n" is a suitable number greater than one. In this mode, constructive feedback is also provided to the user. For example, a threshold can be established so that if the user strays too much (i.e., in excess of the threshold) from the line of the evolving shape 330, the evolving shape 330 pauses and the user is directed (e.g., by speech synthesis) to re-do the latest portion of the shape.

Figure 4:
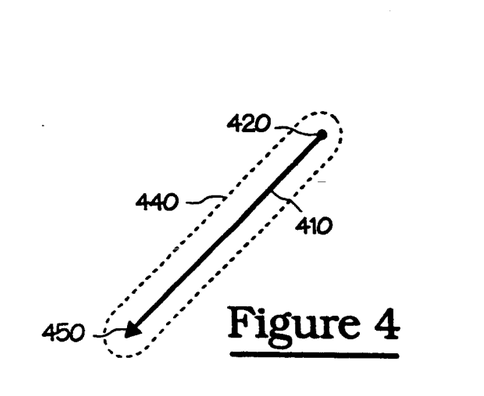
FIG. 4 is a schematic view of a feature of the interactive training aid system of the present invention.

FIG. 4 illustrates another aspect of the invention. A line 410 (or shape, or symbol) is displayed on the display screen. A dashed line 440 indicates tolerance limits for tracing the line. It is intended that the line 410 be traced (with the stylus 120) from a starting point 420 to an endpoint 450 (arrow head). The tolerance line 440 can be displayed on the screen (e.g., in a different color from that of the line 410) but it is not necessary to do so. If the user's stylus motions fall outside of the tolerance line 440, then the computer applies resistance to the motion of the stylus 120 via the resistance control circuit (250, FIG. 2) and force devices 170, 184 (see FIGS. 1c, 1d, 2). The amount of force or resistance can be varied as the user deviates further, thereby encouraging the user to return the stylus to within the tolerance band. The amount of force or resistance at a given deviation (essentially the "gain" of the system) can be varied according to the user's skill level to provide a corrective force (or resistance) ranging anywhere from a gentle "suggestive" corrective force to a heavy "coercive" corrective force.

Figure 5A:
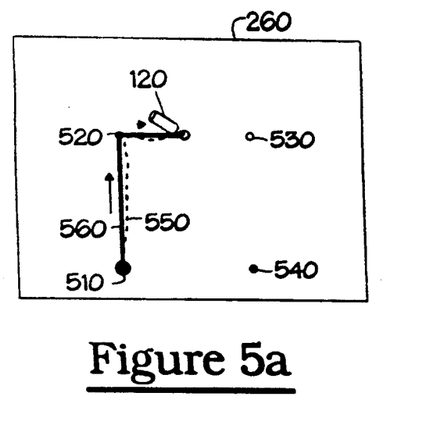
FIGS. 5a and 5b are plan views of the interactive training aid system of the present invention in an exemplary mode of operation.
Figure 5B:
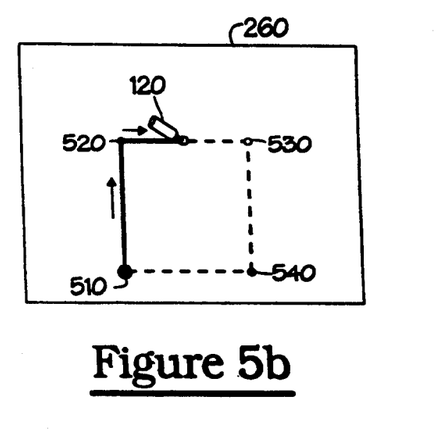

FIGS. 5a and 5b illustrate another aspect of the invention. In FIG. 5a, the computer displays a series of dots indicating vertices (or critical points) of a shaped (or figure) to be formed (in this case, a square having four corners) by the user on the display screen 260. A "starting" dot 510 is indicated by a different color or size than the remaining dots 520, 530 and 540 which have a different appearance, clearly indicating to the user which dot is the starting dot. Once the starting dot has been touched with the stylus 120, the next dot to be traced (e.g., 520) can be highlighted (e.g. with a different color, such as 530, shown hollow in the Figure). As each dot is reached, the next appropriate dot for the user to move the stylus to (in essence, a "waypoint") is indicated in an appropriate sequence. As the stylus 120 traces on the screen, the computer follows its progress and highlights the "ideal" path 560 between the dots, the actual path 550 traced by the stylus, or both. If both are displayed, they can be displayed in different colors or line weights.

FIG. 5b illustrates a similar mode of operation. In this case, however, the correct path 570 between the dots is displayed when the dots are displayed. The user simply traces over the displayed line.

FIGS. 5a and 5b illustrate the concept that the user can be prompted to create a figure (pattern, character) by moving the stylus from dot-to-dot in the display. They also illustrate the concept that various dots can be represented in different visual manners to the user (e.g., the starting dot, a dot already connected, and the next appropriate dot in the sequence). They also illustrate additional cues that may be given the user, such as providing an indication of the "correct" path to be drawn by the user. These, and additional features, as well as threshold feedback mechanisms, such as were described with respect to FIG. 4 are applicable to the various embodiments of the invention set forth herein. Numerous combinations of the various embodiments of the invention (e.g., modes of operation) described herein will be apparent to one of ordinary skill in the art to which the present invention most nearly pertains in light of the descriptions set forth herein.

Figure 6A:
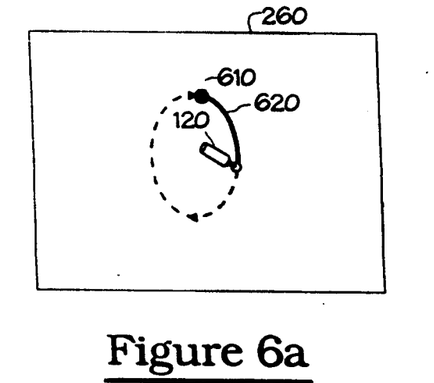
FIGS. 6a and 6b are plan views of the interactive training aid system of the present invention in an exemplary mode of operation.
Figure 6B:
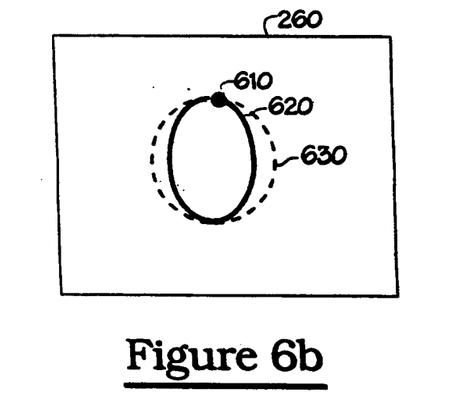

FIGS. 6a and 6b illustrate still another mode of operation, according to the invention. In this mode, the computer directs the user to draw a shape, for example, a circle on the display screen 260. Nothing is displayed (except perhaps a prototype shape as part of the instruction to the user). The user must then trace (or create) the shape on the display screen 260 with the stylus 120. FIG. 6a illustrates a situation where the user has been instructed (e.g., aurally) to draw a circle on the screen 260. Starting at a point 620, the user draws a curved shape 620, which the computer highlights behind the motion of the stylus. (The dashed line in the Figure merely indicates the path that the stylus takes. It is not necessarily displayed.) Evidently, the shape drawn by the user is somewhat elliptical (rather than truly circular). FIG. 6b shows an exemplary response from the computer after the user has completed the attempt to draw a circle. The user's completed elliptical shape 620' is displayed. The computer indicates to the user that the elliptical shape is not perfectly circular (e.g., by an audible message or tone, and/or by displayed text and/or symbols) and displays a proper circle 630 fit as closely as possible to the user's shape 620' on the display screen 260. The user may, at this point, re-try drawing a circle (e.g., the prescribed shape).

Figure 7A:
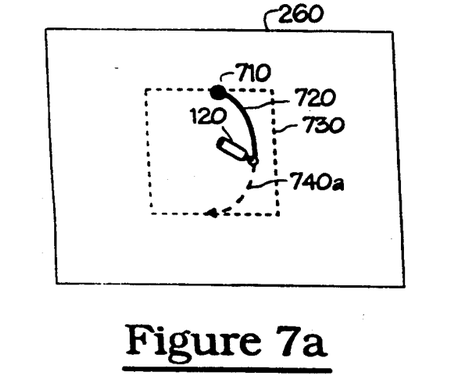
FIGS. 7a and 7b are plan views of the interactive training aid system of the present invention in an exemplary mode of operation.
Figure 7B:
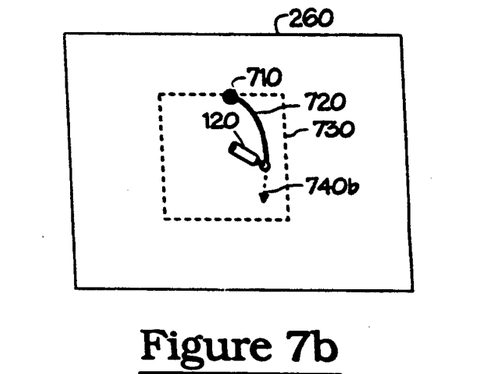

FIGS. 7a and 7b illustrate two additional modes of operation of the system, according to the invention. In FIG. 7a the user has been presented with a task by the computer to "draw a circle in a box". The computer displays a box 730. Starting at a starting point 710, the user begins to draw a curved shape 720 in the box 730 with the stylus 120, and the computer causes the display to indicate the path already taken by the stylus. The computer analyzes the motion of the stylus 120 and projects ahead of the stylus the curvilinear projection 740a of the current path of the stylus. The projection 740a is based upon the past motion of the stylus, and changes as the stylus moves (i.e., the projection is adaptive to the history of stylus movement). It will be evident to one of ordinary skill in the art that many methods of curvilinear projection of a curve (e.g. 720) are known. One such scheme is to use an "nth" order polynomial best fit to the last "n+1"points drawn and simply solving the polynomial to extend the curve. Other techniques are widely known in the art, and it is within the scope and spirit of the invention to use any such technique. FIG. 7b is similar to FIG. 7a, except that instead of a curvilinear projection of the path 720, a linear (tangent) projection 740b is displayed.

Both of these curve projection techniques are especially useful in teaching a user to draw smooth curves and straight lines, since the projections behave in a somewhat "predictive" manner by amplifying deviations from an intended path and helping the user to correct them.

It is within the spirit and scope to use the techniques described hereinabove in combination. For example, the technique described with respect to FIG. 4 whereby a resisting force can be applied to the motion of the stylus can be used in combination with any of the other interactive techniques to guide the hand of a user whose stylus motion falls outside of pre-defined tolerances. If bucking motors are used to apply corrective forces to the stylus, the user can actually be forced to move the stylus in a prescribed path, thereby developing "muscle memory" in the user for the prescribed path.

The path projection techniques described with respect to FIGS. 7a and 7b are also quite useful in combination with the other techniques, providing a good indication of the stylus trajectory and helps to correct problems early in the learning process.

Evidently, the computer must be programmed to perform the various modes of operation and combinations thereof described hereinabove. Based on the modes and combinations desired to be implemented in a particular application of the invention, and given the various "bits and pieces" of such programming readily available (as evidenced by the art incorporated by reference herein, or otherwise readily available), one skilled in the art to which the invention most nearly pertains will readily be able to implement the invention in any desired manner.

The system of the present invention forms an intelligent input device useful as a tracing device for children's educational programs (software products), as a freehand drawing (sketching) device for painting programs or other image-creation programs, as an input device for interactive game machines, as an input device for a store-as-you-write notebook computer, as a mouse or trackball replacement (e.g., extension) for conventional computers, as a pen computer input device, and as a redraft to existing PCs to enable the PC (personal computer) to function as a pen computer. The invention offers advantages over existing products in terms of performance, size, portability, packaging and potential applications.

What is claimed is:

1. A method of interactive training, comprising:
   providing a coordinate input device, said coordinate input device adapted to trace movement of a stylus over a writing surface and to provide stylus coordinates to computer controller;
   providing a display screen in the writing surface under the stylus;
   associating stylus coordinates over the display screen with corresponding display screen coordinates;

prompting a user to perform a training exercise by the user moving the stylus over the display screen to trace an object shape;

monitoring the movement imparted to the stylus by the user and comparing the user-imparted stylus movement against pre-stored object data;

providing visual feedback to the user via the display screen indicative of the user's performance of the training exercise;

providing pre-stored tolerances associated with the pre-stored object data; and

Providing adaptive resistance to movement of the stylus in response to deviations of the user in performing the training exercise.

2. A method according to claim 1, further comprising:

providing means for generating audible sounds to prompt the user to perform the training exercise.

3. A method according to claim 1, further comprising:

providing audible feedback to the user indicative of the user's performance of the training exercise.

4. A method according to claim 1, further comprising:

highlighting the user's stylus motions by creating a visual indication of the stylus path on the display screen.

5. A method according to claim 1, wherein prompting the user to perform a training exercise includes:

displaying on the display screen visible cues as to the correct performance of the training exercise.

6. A method according to claim 1, wherein prompting the user to perform a training exercise includes:

displaying on the display screen visible indications of portions of the training exercise already completed by the user.

7. A method according to claim 6, further comprising:

displaying on the display screen visible indications of portions of the training exercise yet to be completed by the user.

8. A method according to claim 1, wherein providing visual feedback to the user indicative of the user's performance of the training exercise includes:

displaying the user's performance of the training exercise contemporaneously with a display of the pre-stored object data.

9. A method of interactive training, comprising:

providing a coordinate input device, said coordinate input device adapted to trace movement of a stylus over a writing surface and to provide stylus coordinates to computer controller;

providing a display screen in the writing surface under the stylus;

associating stylus coordinates over the display screen with corresponding display screen coordinates;

prompting a user to perform a training exercise by the user moving the stylus over the display screen to trace an object shape;

monitoring the movement imparted to the stylus by the user and comparing the user-imparted stylus movement against pre-stored object data;

providing visual feedback to the user via the display screen indicative of the user's performance of the training exercise;

causing the stylus to move in accordance with the pre-stored object data; and

Providing adaptive resistance to movement of the stylus in response to deviations of the user in performing the training exercise.

* * * * *